(12) United States Patent
Liu

(10) Patent No.: US 12,104,767 B1
(45) Date of Patent: Oct. 1, 2024

(54) QUICK ASSEMBLING STRUCTURE FOR CEILING FAN WITH LAMP

(71) Applicant: AIR COOL INDUSTRIAL CO., LTD., Taichung (TW)

(72) Inventor: Tim Liu, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/371,436

(22) Filed: Sep. 21, 2023

(51) Int. Cl.

| | |
|---|---|
| ***F21S 8/04*** | (2006.01) |
| ***F04D 19/00*** | (2006.01) |
| ***F04D 29/64*** | (2006.01) |
| ***F21V 17/14*** | (2006.01) |
| ***F21V 29/74*** | (2015.01) |
| ***F21V 33/00*** | (2006.01) |

(52) U.S. Cl.
CPC ............ *F21S 8/043* (2013.01); *F04D 19/002* (2013.01); *F04D 29/646* (2013.01); *F21V 29/74* (2015.01); *F21V 33/0096* (2013.01)

(58) Field of Classification Search
CPC ........ F21V 17/14; F21V 17/18; F21V 17/104; F21V 33/0096; F21V 29/70; F21S 8/043
See application file for complete search history.

(56) References Cited

U.S. PATENT DOCUMENTS

| | | | | |
|---|---|---|---|---|
| 1,008,344 | A * | 11/1911 | Larzelere | F21V 17/14 362/434 |
| 1,743,847 | A * | 1/1930 | Doane | F21V 17/14 362/433 |
| 3,524,981 | A * | 8/1970 | Auerbach | F21V 17/14 362/433 |
| 4,754,383 | A * | 6/1988 | Klaus | F21V 17/14 403/349 |
| 4,982,313 | A * | 1/1991 | Lupien | F21V 17/14 362/439 |
| 5,466,020 | A * | 11/1995 | Page | F16L 37/252 285/376 |
| 5,560,707 | A * | 10/1996 | Neer | F21V 15/005 215/218 |
| 5,667,251 | A * | 9/1997 | Prest | F16L 37/248 285/376 |
| 5,704,659 | A * | 1/1998 | Lunder | F16L 55/1155 285/361 |
| 6,318,683 | B1 * | 11/2001 | Savoy | A47G 23/0225 403/348 |
| 6,350,045 | B1 * | 2/2002 | Pearce | F21V 17/14 362/438 |

(Continued)

*Primary Examiner* — Ismael Negron
(74) *Attorney, Agent, or Firm* — Ying-Ting Chen

(57) ABSTRACT

A quick assembling structure includes a first seat, a second seat, and two elastic plates. The first seat and the second seat are configured to be coupled to a ceiling fan body and a lamp. The first seat has two bars. The second seat has two bar entrances, two longitudinal grooves, and two guide grooves. The elastic plates are disposed in the respective guide grooves, and each have a contact portion and a holding portion. When in use, the bars of the first seat are inserted into the bar entrances, the longitudinal grooves and the guide grooves, the bars are pushed to pass through the contact portions of the elastic plates, and the bars are secured between the contact portions and the holding portions of the elastic plates and the guide grooves.

7 Claims, 5 Drawing Sheets

(56) References Cited

U.S. PATENT DOCUMENTS

| | | | | |
|---|---|---|---|---|
| 6,655,821 | B1 * | 12/2003 | Tai | F21V 17/14<br>362/453 |
| 7,300,248 | B2 * | 11/2007 | Wang | F04D 25/088<br>248/343 |
| 7,367,688 | B1 * | 5/2008 | Bucher | C12N 15/86<br>362/267 |
| 7,488,090 | B1 * | 2/2009 | Bucher | F21V 21/02<br>362/267 |
| 8,845,146 | B2 * | 9/2014 | Blankestijn | F21V 17/14<br>362/651 |
| 9,459,002 | B2 * | 10/2016 | Vogt | F21V 29/50 |
| 9,822,946 | B2 * | 11/2017 | Yamamoto | F21V 17/14 |
| 11,506,377 | B1 * | 11/2022 | Wang | F21V 17/16 |

* cited by examiner

QUICK ASSEMBLING STRUCTURE FOR CEILING FAN WITH LAMP

FIELD OF THE INVENTION

The present invention relates to a ceiling fan, and more particularly to a quick assembling structure for a ceiling fan with a lamp.

BACKGROUND OF THE INVENTION

Conventional ceiling fans are mostly fixed to the ceiling. In order to save the installation space of a lamp, a ceiling fan is usually combined with a lamp under the ceiling fan. With the setting of the lamp, the ceiling fan has a lighting effect. The lamp and the ceiling fan are connected to each other by means of a locking, tightening, or snap-fit structure.

As to the locking structure, it is required to use tools at the height of the ceiling for installing the lamp and the ceiling fan. It is dangerous for the operator to install the lamp and the ceiling fan. The installation speed is slow. If the lamp is large in size, it is not easy to install the lamp.

As to the snap-fit structure, two transverse, opposing cylindrical posts are provided on the lower end of the ceiling fan, and two retaining structures are provided on the lamp. The cylindrical posts are coupled to the retaining structures, so as to complete the installation of the ceiling fan and the lamp. Because the cylindrical posts have a circular shape, when the friction between the retaining structures and the cylindrical posts is insufficient, the lamp is prone to wobbling in the circumferential direction of the cylindrical posts.

As to the tightening or quick assembling structure, if the ceiling fan runs and vibrates for a long time, it is easy to cause the lamp to fall. Accordingly, the inventor of the present invention has devoted himself based on his many years of practical experiences to solve these problems.

SUMMARY OF THE INVENTION

The primary object of the present invention is to provide a quick assembling structure for a ceiling fan with a lamp, which improves the convenience and safety for the assembly of the ceiling fan and the lamp.

In order to achieve the foregoing object, the present invention provides a quick assembling structure for a ceiling fan with a lamp. The quick assembling structure is mounted to a ceiling fan. The ceiling fan has a ceiling fan body and a lamp under the ceiling fan body. The quick assembling structure comprises a first seat, a second seat, and two elastic plates. The first seat is disposed on one of the ceiling fan body and the lamp. The first seat includes two bars extending transversely from one side of the first seat. The bars are spaced apart. The bars each have two opposing flat surfaces and two opposing curved surfaces. Two ends of each of the flat surfaces are connected to the curved surfaces, respectively. The second seat has a fixed side and a connecting side. The fixed side of the second seat is fixedly connected to the other one of the ceiling fan body and the lamp. The connecting side is opposite to the fixed side. The first seat is connected to the connecting side of the second seat. The connecting side of the second seat has bar entrances corresponding to the bars for receiving the bars. The bar entrances each communicate with one side of a longitudinal groove. Another side of the longitudinal groove communicates with a guide groove. The guide groove gradually tapers and extends toward a distal end along a guide direction via a guide path. The guide direction is not parallel to a longitudinal direction. The longitudinal groove and the guide groove are configured to guide a corresponding one of the bars. The distal end of the guide groove is away from the connecting side. Another end of the guide groove is close to the connecting side. The guide groove has a slope close to the connecting side. The slope of the guide groove has a recess for receiving the corresponding bar. The elastic plates each correspond to the guide groove. The elastic plates each have a fixed end and an open end. The fixed ends of the elastic plates are fixedly connected to the second seat. The open end of each elastic plate has a contact portion. The contact portions of the elastic plates and the slopes correspond to the flat surfaces of the bars. The elastic plates each have a holding portion between the contact portion and the fixed end. The contact portion and the holding portion of the elastic plate are located between the recess and the distal end of the corresponding guide groove. When the elastic plates are in a normal state, the contact portions and the holding portions of the elastic plates are in the guide paths of the corresponding guide grooves for pushing and holding the bars. When a user applies an external force to the contact portions of the elastic plates through the bars, the contact portions of the elastic plates are moved away from the guide paths. When the bars are in the guide paths and between the contact portions and the holding portions of the elastic plates, the contact portions and the holding portions of the elastic plates and the slopes of the guide grooves secure the bars.

In the quick assembling structure provided by the present invention, the bars of the first seat are inserted into the bar entrances, the longitudinal grooves and the guide grooves, the bars are pushed to pass through the contact portions of the elastic plates, and the bars are secured between the contact portions and the holding portions of the elastic plates and the slopes of the guide grooves, so that the first seat and the second seat are coupled to each other to quickly complete assembly of the ceiling fan and the lamp. When the bars are subjected to an expected external force that causes the bars to be in an unlocked state, the recesses are configured to receive the bars to prevent the bars from leaving the guide grooves, so as to prevent the lamp from falling.

DETAILED DESCRIPTION OF THE PREFERRED EMBODIMENTS

Figure 1:
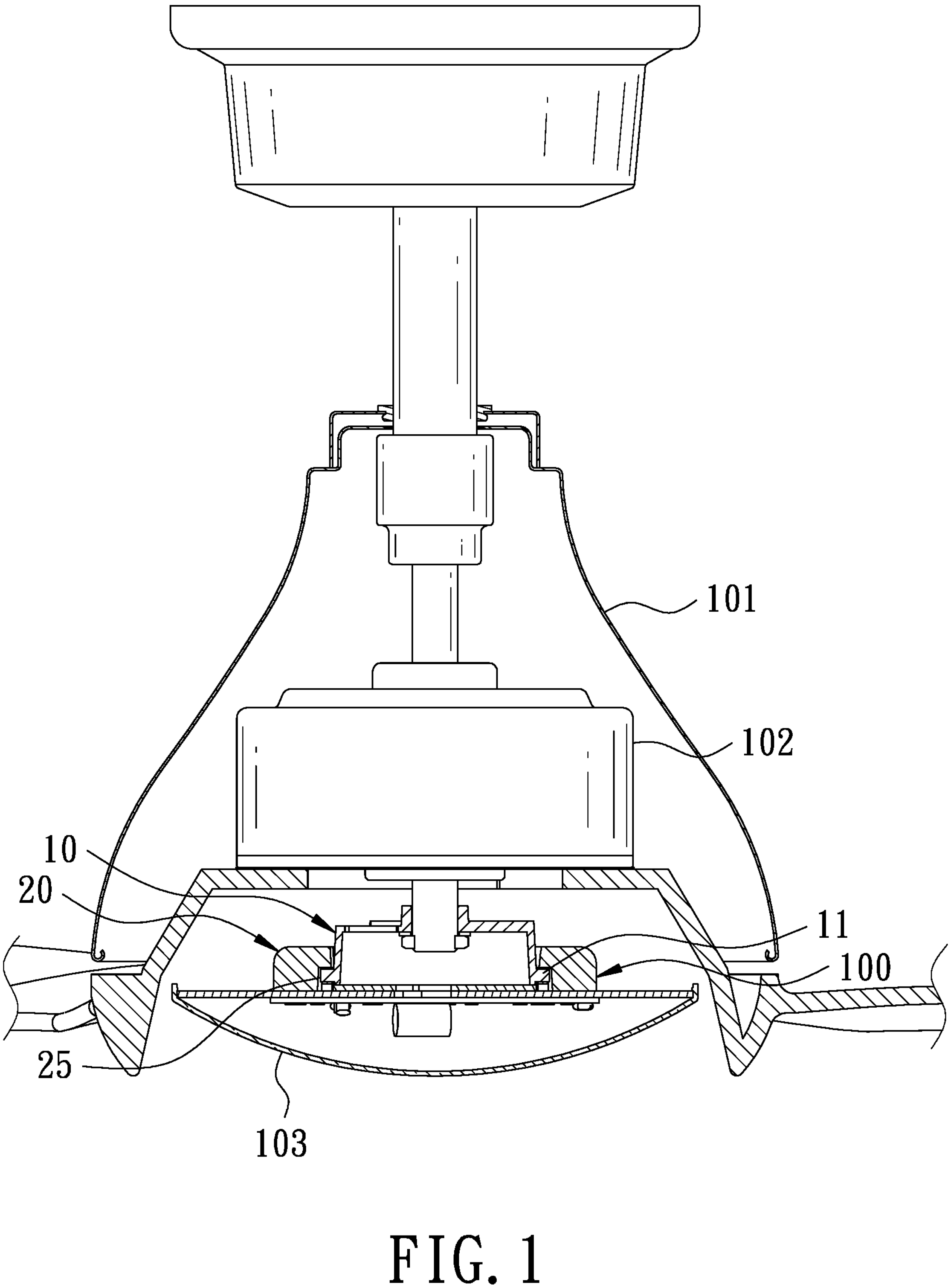
FIG. 1 is a cross-sectional view in accordance with an embodiment of the present invention.

Embodiments of the present invention will now be described, by way of example only, with reference to the accompanying drawings.

FIGS. 1-8 illustrate an embodiment of the present invention. The present invention discloses a quick assembling structure 100 for a ceiling fan with a lamp. The quick assembling structure 100 is mounted to a ceiling fan 101. The ceiling fan 101 has a ceiling fan body 102 and a lamp 103 under the ceiling fan body 102. The quick assembling structure 100 comprises a first seat 10, a second seat 20, two elastic plates 30, a cooling hole portion 40, and a cooling fin portion 50.

The first seat 10 is disposed on one of the ceiling fan body 102 and the lamp 103. In this embodiment of the present invention, the first seat 10 is disposed on the ceiling fan body 102. The first seat 10 includes two bars 11 extending transversely from one side of the first seat 10. The bars 11 are equally spaced apart. The bars 11 each have two opposing flat surfaces 12 and two opposing curved surfaces 13. Two ends of each of the flat surfaces 12 are connected to the curved surfaces 13, respectively. At least one first side wall 14 is disposed on the outer side of the first seat 10. The bars 11 extend outwardly from the at least one first side wall 14.

The second seat 20 has a fixed side 21 and a connecting side 22. The fixed side 21 of the second seat 20 is fixedly connected to the other one of the ceiling fan body 102 and the lamp 103. In this embodiment of the present invention, the fixed side 21 of the second seat 20 is fixedly connected to the lamp 103. The connecting side 22 is opposite to the fixed side 21. The first seat 10 is connected to the connecting side 22 of the second seat 20. The connecting side 22 of the second seat 20 has bar entrances 23 corresponding to the bars 11 for receiving the bars 11. The bar entrances 23 each communicate with one side of a longitudinal groove 24. The other side of the longitudinal groove 24 communicates with a guide groove 25. The guide groove 25 gradually tapers and extends toward a distal end 251 along a guide direction A via a guide path B. The guide direction A is not parallel to the longitudinal direction C. The guide direction A is the circumferential direction of the second seat 20. The longitudinal groove 24 and the guide groove 25 guide the corresponding bar 11. The distal end 251 of the guide groove 25 is away from the connecting side 22, and the other end of the guide groove 25 is close to the connecting side 22 and the longitudinal groove 24. The guide groove 25 has a slope 252 close to the connecting side 22. The slope 252 of the guide groove 25 has a recess 253 corresponding to the corresponding bar 11, so that the corresponding bar 11 may be received in the recess 253. The inner side of the second seat 20 has at least one second side wall 26 corresponding to the at least one first side wall 14 of the first seat 10. The at least one second side wall 26 has a connecting opening 27 on the connecting side 22 corresponding to the first seat 10. The bar entrances 23, the longitudinal grooves 24, the guide grooves 25 and the recesses 253 are recessed outwardly from the at least one second side wall 26 for receiving the first seat 10.

The elastic plates 30 each correspond to the guide groove 25. The elastic plate 30 has a fixed end 31 and an open end 32. The fixed end 31 of the elastic plate 30 is fixedly connected to the second seat 20. The open end 32 of the elastic plate 30 has a contact portion 33. The contact portion 33 of the elastic plate 30 and the slope 252 correspond to the flat surfaces 12 of the bar 11, respectively. The elastic plate 30 has a holding portion 34 between the contact portion 33 and the fixed end 31. The contact portion 33 and the holding portion 34 of the elastic plate 30 are located between the recess 253 and the distal end 251 of the guide groove 25. The contact portion 33 and the holding portion 34 of the elastic plate 30 extend toward the connecting side 22 of the second seat 20. When the elastic plates 30 are in a normal state, the contact portions 33 and the holding portions 34 of the elastic plates 30 are in the guide paths B of the corresponding guide grooves 25 for pushing and holding the bars 11. When the user applies an external force to the contact portions 33 of the elastic plates 30 through the bars 11, the contact portions 33 of the elastic plates 30 are moved away from the guide paths B. When the bars 11 are in the guide paths B and between the contact portions 33 and the holding portions 34 of the elastic plates 30, the bars 11 are secured between the contact portions 33 and the holding portions 34 of the elastic plates 30 and the slopes 252 of the guide grooves 25, respectively.

The cooling hole portion 40 has at least one cooling hole 41. The cooling hole portion 40 is disposed on one of the first seat 10 and the second seat 20.

The cooling fin portion 50 has a plurality of cooling fins 51. The cooling fin portion 50 is disposed on one of the first seat 10 and the second seat 20. Because the heat source is generated by the lamp 103, in this embodiment of the present invention, the cooling fin portion 50 is disposed in the first seat 10 or the second seat 20 which is fixedly connected to the lamp 103. The cooling fin portion 50 directly contacts the heat source, thus having a better heat dissipation effect. In addition, the cooling fin portion 50 is located on the outer side of the first seat 10 and the second seat 20. They are not limited by the first seat 10 and the second seat 20, so as to increase the area of the cooling fins 51 freely.

Referring to FIGS. 2-8, when the quick assembling structure 100 is to be assembled, the bars 11 of the first seat 10 are inserted into the bar entrances 23, the longitudinal grooves 24 and the guide grooves 25 of the second seat 20, the bars 11 of the first seat 10 are moved along the guide direction A via the guide paths B toward the distal ends 251, the bars 11 of the first seat 10 are pushed to pass through the contact portions 33 of the elastic plates 30, and the contact portions 33 and the holding portions 34 of the elastic plates 30 and the slopes 252 of the guide grooves 25 secure the bars 11, so that the ceiling fan body 102 and the lamp 103 are coupled to each other, so as to quickly complete the assembly of the ceiling fan 101. When the bars 11 are pushed against the contact portions 33 of the elastic plates 30, the elastic plates 30 touch the bars 11 via their elastic force, so that the user can confirm the position of the bars 12 via a touch feeling or a touch sound.

Compared with the conventional quick assembling structure having more than three cylindrical posts, the number of the bars 11 of the present invention is two. It is beneficial for the ceiling fan to be positioned on the ceiling easily.

When the quick assembling structure 100 is to be disassembled, the second seat 20 with the lamp 103 is rotated in an opposite direction, and the bars 11 of the first seat 10 are pushed to pass through the contact portions 33 of the elastic plates 30, so that the first seat 10 and the second seat 20 are separated.

Figure 2:
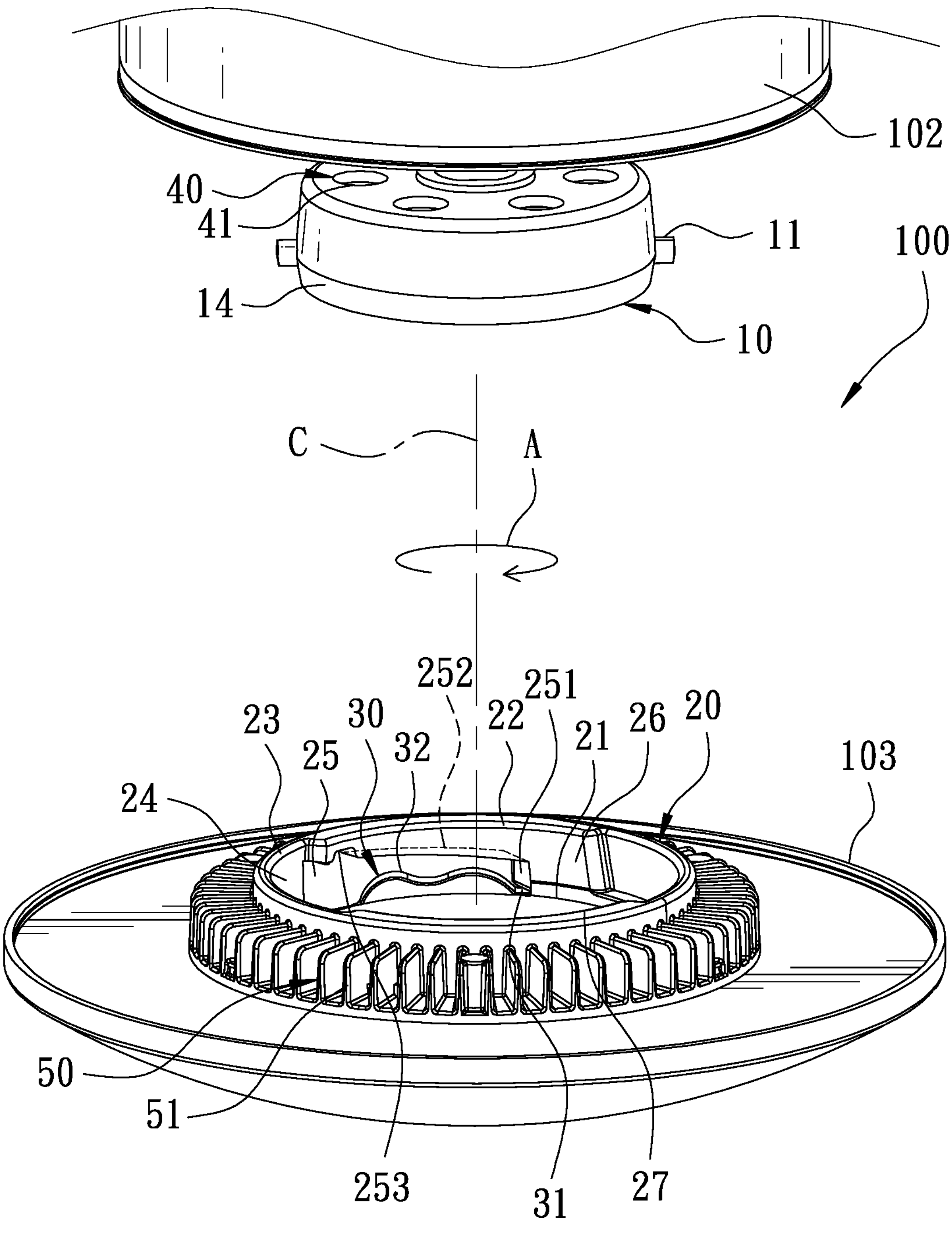
FIG. 2 is a partial exploded view in accordance with the embodiment of the present invention.
Figure 3:
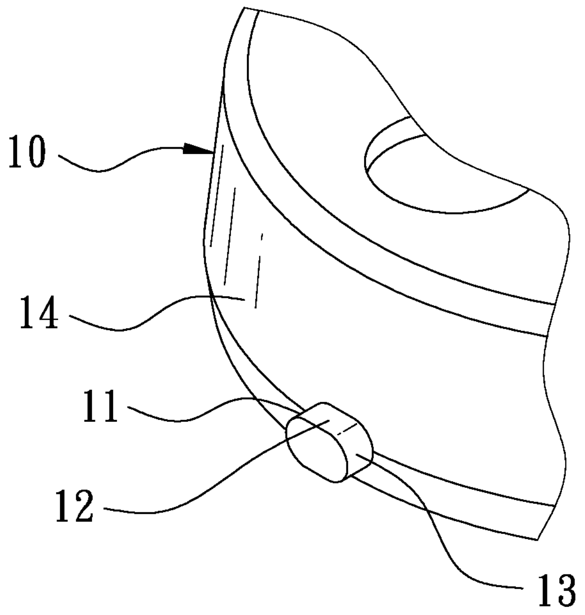
FIG. 3 is a partial perspective view of a first seat having a bar in accordance with the embodiment of the present invention.
Figure 4:
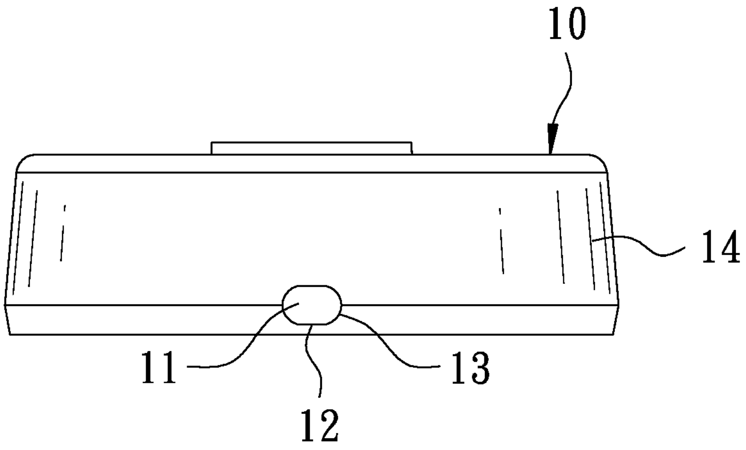
FIG. 4 is a side view of the first seat having the bar in accordance with the embodiment of the present invention.
Figure 5:
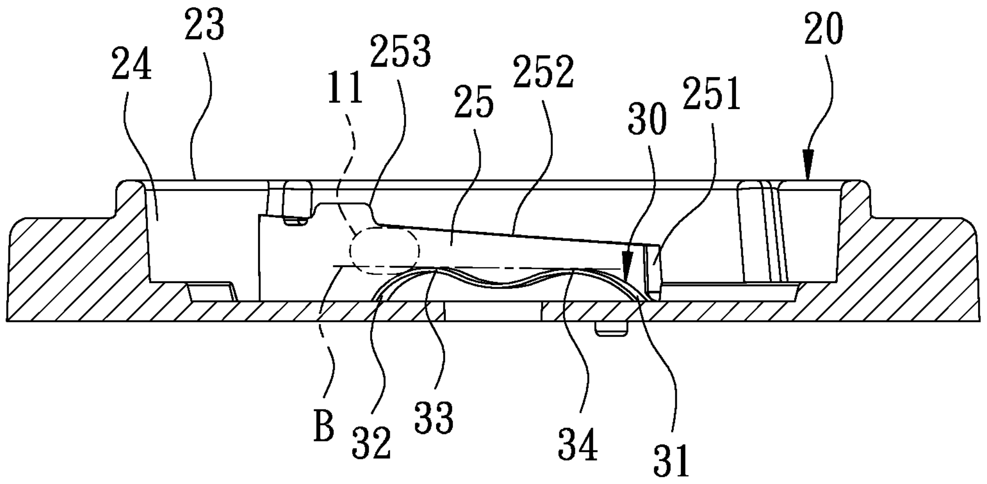
FIG. 5 is a schematic view of the embodiment of the present invention when in use, wherein the bar does not exert force on a contact portion of an elastic plate.
Figure 6:
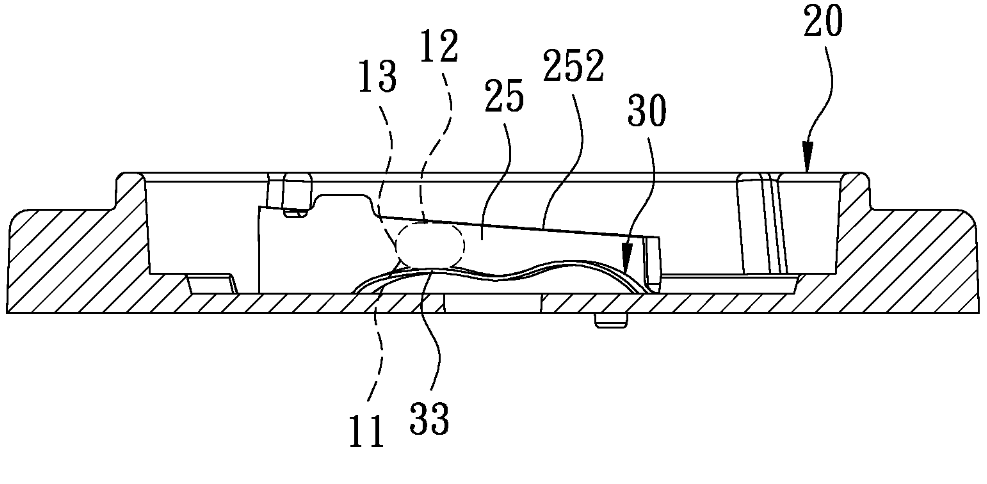
FIG. 6 is a schematic view of the embodiment of the present invention when in use, wherein the bar exerts force on the contact portion of the elastic plate.

Referring to FIG. 2, the distal end 251 of the guide groove 25 is away from the connecting side 22, and the other end of the guide groove 25 is close to the connecting side 22, and the guide groove 25 has the slope 252 close to the connecting side 22. When the bars 11 are moved toward the distal ends 251 along the slopes 252 of the guide grooves 25, the lamp 103 and the second seat 20 are gradually moved toward the first seat 10 and the ceiling fan body 102, so that the lamp 103 is gradually moved toward the ceiling fan body 102, minimizing the distance and gap between the ceiling fan body 102 and the lamp 103.

Referring to FIG. 3 through FIG. 6, because the contact portions 33 of the elastic plates 30 and the slopes 252 of the present invention correspond to the flat surfaces 12 of the bars 11, when the bars 11 of the first seat 10 are moved in the guide grooves 25, the curved surfaces 13 and the flat surfaces 12 of the bars 11 are in contact with the contact portions 33 of the elastic plates 30 and the slopes 252 of the guide grooves 25, so that the bars are moved smoothly, thereby overcoming the shortcomings of the aforementioned prior art. In the aforementioned prior art, the two cylindrical posts have a small contact area in the retaining structure and are prone to wobble when they are moved.

Figure 7:
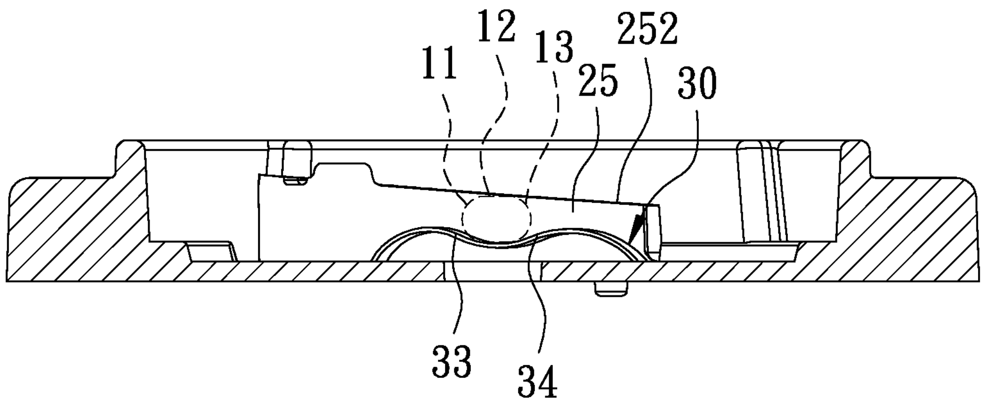
FIG. 7 is a schematic view of the embodiment of the present invention when in use, wherein the bar is secured between the contact portion and a holding portion of the elastic plate and a slope of a guide groove.

Referring to FIG. 7, the bars 11 each have the two opposing flat surfaces 12 and the two opposing curved surfaces 13. When the bars 11 are secured by the contact portions 33 and the holding portions 34 of the elastic plates 30 and the slopes 252 of the guide grooves 25, the bars 11 have a larger contact area and frictional force, thereby overcoming the shortcomings of the aforementioned prior art. In the aforementioned prior art, the friction force is insufficient so the two cylindrical posts are easy to wobble when secured in the retaining structure.

Figure 8:
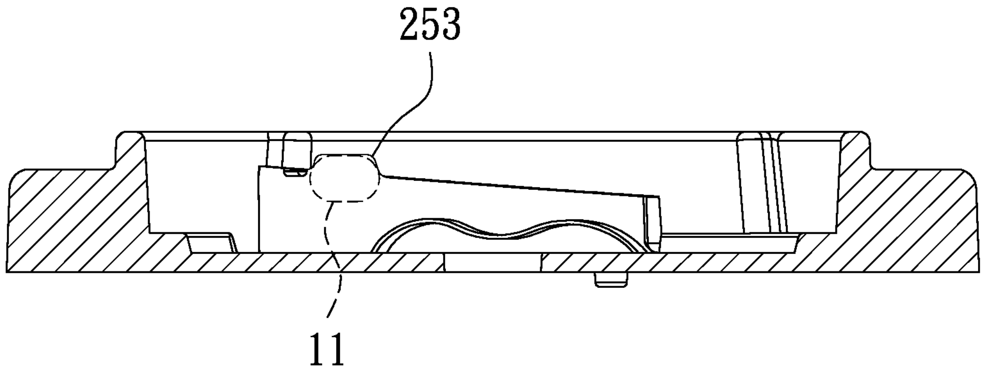
FIG. 8 is a schematic view of the embodiment of the present invention when in use, wherein the bar is displaced to a recess.

Referring to FIG. 8, when the bars 11 are subjected to an expected external force that causes the bars 11 to be in an unlocked state, the bars 11 will be displaced to the recesses 253 to prevent the bars 11 from leaving the guide grooves 25, so as to prevent the lamp 103 from falling.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick assembling structure, mounted to a ceiling fan, the ceiling fan having a ceiling fan body and a lamp under the ceiling fan body, the quick assembling structure comprising:

a first seat, disposed on one of the ceiling fan body and the lamp, the first seat including two bars extending transversely from one side of the first seat, the bars being spaced apart, the bars each having two opposing flat surfaces and two opposing curved surfaces, two ends of each of the flat surfaces being connected to the curved surfaces, respectively;

a second seat, having a fixed side and a connecting side, the fixed side of the second seat being fixedly connected to the other one of the ceiling fan body and the lamp, the connecting side being opposite to the fixed side, the first seat being connected to the connecting side of the second seat, the connecting side of the second seat having bar entrances corresponding to the bars for receiving the bars, the bar entrances each communicating with one side of a longitudinal groove, another side of the longitudinal groove communicating with a guide groove, the guide groove gradually tapering and extending toward a distal end along a guide direction via a guide path, the guide direction being not parallel to a longitudinal direction, the longitudinal groove and the guide groove being configured to guide a corresponding one of the bars, the distal end of the guide groove being away from the connecting side, another end of the guide groove being close to the connecting side, the guide groove having a slope close to the connecting side, the slope of the guide groove having a recess for receiving the corresponding bar;

two elastic plates, each corresponding to the guide groove, the elastic plates each having a fixed end and an open end, the fixed ends of the elastic plates being fixedly connected to the second seat, the open end of each elastic plate having a contact portion, the contact portions of the elastic plates and the slopes corresponding to the flat surfaces of the bars, the elastic plates each having a holding portion between the contact portion and the fixed end, the contact portion and the holding portion of each elastic plate being located between the recess and the distal end of the corresponding guide groove, wherein when the elastic plates are in a normal state, the contact portions and the holding portions of the elastic plates are in the guide paths of the corresponding guide grooves for pushing and holding the bars; when a user applies an external force to the contact portions of the elastic plates through the bars, the contact portions of the elastic plates are moved away from the guide paths; when the bars are in the guide paths and between the contact portions and the holding portions of the elastic plates, the contact portions and the holding portions of the elastic plates and the slopes of the guide grooves secure the bars;

wherein the bars of the first seat are inserted into the bar entrances, the longitudinal grooves and the guide grooves, the bars are pushed to pass through the contact portions of the elastic plates, and the bars are secured between the contact portions and the holding portions of the elastic plates and the slopes of the guide grooves, so that the first seat and the second seat are coupled to each other to quickly complete assembly of the ceiling fan and the lamp; wherein when the bars are subjected to an expected external force that causes the bars to be in an unlocked state, the recesses are configured to receive the bars to prevent the bars from leaving the guide grooves, so as to prevent the lamp from falling.

2. The quick assembling structure as claimed in claim 1, wherein at least one first side wall is disposed on an outer side of the first seat, the bars extend outwardly from the at least one first side wall, an inner side of the second seat has at least one second side wall, the at least one second side wall has a connecting opening on the connecting side corresponding to the first seat, the bar entrances, the longitudinal grooves, the guide grooves and the recesses are recessed outwardly from the at least one second side wall for receiving the first seat.

3. The quick assembling structure as claimed in claim 1, further comprising a cooling hole portion and a cooling fin portion, wherein the cooling hole portion has at least one cooling hole, the cooling hole portion is disposed on one of the first seat and the second seat, the cooling fin portion has a plurality of cooling fins, the cooling fin portion is disposed on one of the first seat and the second seat, and the cooling fin portion is located on an outer side of the first seat or the second seat.

4. The quick assembling structure as claimed in claim 1, further comprising a cooling hole portion and a cooling fin portion, wherein the cooling hole portion has at least one cooling hole, the cooling hole portion is disposed in the first seat or the second seat, the cooling fin portion has a plurality of cooling fins, the cooling fin portion is disposed in the first seat or the second seat which is fixedly connected to the lamp, and the cooling fin portion is located on an outer side of the first seat and the second seat.

5. The quick assembling structure as claimed in claim 1, wherein the guide direction is a circumferential direction of the second seat.

6. The quick assembling structure as claimed in claim 1, wherein the bars are equally spaced apart.

7. The quick assembling structure as claimed in claim 1, wherein the contact portions and the holding portions of the elastic plates extend toward the connecting side of the second seat.

* * * * *